UNITED STATES PATENT OFFICE.

PEDER FARUP, OF CHRISTIANIA, NORWAY, ASSIGNOR, BY MESNE ASSIGNMENTS, TO TITAN CO. A/S., OF CHRISTIANIA, NORWAY.

MANUFACTURE OF TITANIUM-OXYGEN COMPOUNDS.

1,341,307.   Specification of Letters Patent.   Patented May 25, 1920.

No Drawing. Application filed October 25, 1916, Serial No. 127,681. Renewed September 29, 1919. Serial No. 327,170.

*To all whom it may concern:*

Be it known that I, PEDER FARUP, a subject of the King of Norway, residing at Christiania, Norway, have invented certain new and useful Improvements in the Manufacture of Titanium-Oxygen Compounds; and I do hereby declare the following to be a full, clear, and exact description of the invention, such as will enable others skilled in the art to which it appertains to make and use the same.

This invention relates to a treatment of titanium oxygen compounds which may contain one or more other substances, for instance iron or other metals, whereby the properties of the material are altered and whereby a product is obtained which is especially adapted for use as or in the manufacture of white or light colored pigments, although not confined thereto. The invention contemplates both the process and the product.

One of the processes heretofore employed for producing white or light colored titanium oxygen compounds from titanium hydrate compounds, or other titanium oxygen compounds containing more or less foreign substance, is commonly referred to as the smelting process. That process is based upon decomposition of the titanium materials by means of a suitable quantity of sulfuric acid or bisulfate; fusion of the decomposition product in the presence of a halogen salt in suitable quantities at temperatures substantially between 500° C. and 700° C.; and leaching the resultant mass, whereby white or light colored titanium oxygen compounds in the form of oxids, accompanied by more or less foreign substance, are obtained.

According to the present invention, titanium oxygen compounds of a white or light color and of quite a different character, especially in regard to their physical properties, are produced by a process which is mainly characterized by the use of comparatively low temperatures in the heating operation to which the decomposition product is subjected. The temperatures used in connection with this method range from about 300° to 500° C.

In order that the invention may be readily comprehended the following example is given, but it should be understood that this is for illustrative purposes and that the invention is not intended to be limited thereby, nor to the specific materials selected.

Titanium hydrate compounds or other titanium oxygen compounds containing foreign substance are first treated with a suitable quantity of sulfuric acid or bisulfate at an elevated temperature until the sulfuric acid or bisulfate has reacted with the original material and the free acid has been combined. The resulting mass is then disintegrated and ground with a suitable quantity of sodium chlorid or other chlorid or fluorid. The mixture thus obtained is then subjected to heating in a suitable furnace at a temperature ranging substantially from 300° to 500° C. during which step the mixture is periodically stirred. A sintering of the mixture, more or less complete, will take place, the pulverized material being transformed into porous lumps. The sintered mass is then cooled and leached according to the counter-current principle, whereupon the residue, comprising essentially titanium oxygen compounds, is recovered by filtration, washed and dried.

The titanium remaining in the filtrate as a chlorid or sulfate can be recovered by precipitation in any well known or convenient manner, as by boiling with the aid of indirect steam, the volume of the solution being maintained constant during precipitation. The titanium compounds thus precipitated are of about the same degree of purity as the initial material and may be subjected to a repetition of the above process.

The filtrate remaining after the titanium compounds have been precipitated as thus indicated may be further treated to recover the salts of the halogen compound employed, for example, the sodium salts.

The acid escaping in the form of a gas during heating may also be recovered by any well known or convenient process as by condensation or absorption.

The product obtained in accordance with this process obviously depends upon the composition of the original titanium oxygen compound employed. With the compound chosen for illustrative purposes, which is one very suitable for this treatment, and where sulfuric acid is used as the decomposition agent and the decomposed mass is sintered with sodium chlorid, the resulting titanium oxygen compound will comprise titanium oxid containing a low content of water of hydration, together with small amounts of sulfuric anhydrid and iron.

The product obtained by this process is white or of a light color, depending upon the foreign substance present. It is characterized by an exceedingly large oil carrying capacity.

The foregoing detailed description has been given for clearness of understanding and no undue limitation should be deduced therefrom, but the appended claims should be construed as broadly as permissible in view of the prior art.

What I claim as new and desire to secure by Letters Patent is:

1. The process of treating titanium oxygen compounds, which comprises subjecting the compounds to the action of a decomposing agent, heating the resultant product in the presence of a halogen salt to effect a sintering of the said product, and recovering the titanium compounds from the sintered mass.

2. The process of treating titanium oxygen compounds which comprises subjecting the compounds to the action of a decomposing agent, heating the resultant product in the presence of a halogen compound to a temperature ranging substantially from 300° to 500° C. whereby a sintering of the product is obtained, and recovering the titanium oxygen compounds from the sintered mass.

3. The process of treating titanium oxygen compounds which comprises subjecting the compounds to the action of the sulfuric acid, heating the resultant product in the presence of a halogen compound to effect a sintering of the said product, and recovering the titanium oxygen compound from the sintered mass.

4. The process of treating titanium oxygen compounds which comprises, subjecting the compounds to the action of sulfuric acid, heating the resultant product to a temperature ranging substantially from 300° to 500° C. in the presence of a chlorid whereby a sintering of the mass is obtained, and recovering the titanium oxygen compounds from the sintered mass.

5. The process of treating titanium oxygen compounds which comprises, subjecting the compounds to the action of sulfuric acid, heating the resultant product in the presence of sodium chlorid to effect a sintering of the said product, and recovering the titanium oxygen compounds from the sintered mass.

6. The process of treating titanium oxygen compounds which comprises, subjecting the compounds to the action of sulfuric acid, heating the resultant product to a temperature ranging substantially from 300° to 500° C. in the presence of sodium chlorid whereby a sintering of the product is obtained, and recovering the titanium oxygen compounds from the sintered mass by leaching.

7. The process of treating a titanium hydrate containing iron and sulfuric anhydrid which comprises, subjecting the compound to the action of a decomposing agent, heating the resultant product to a comparatively low temperature in the presence of a halogen compound to effect a sintering of the said product, and recovering the resultant combined titanium from the sintered mass.

8. The process of treating a titanium hydrate containing iron and sulfuric anhydrid which comprises, subjecting the compound to the action of sulfuric acid, heating the resultant product to a temperature ranging substantially from 300° to 500° C. in the presence of a chlorid whereby a sintering of the product is obtained, and recovering the resultant combined titanium from the sintered mass by leaching.

9. The process of treating a titanium hydrate containing iron and sulfuric acid which comprises, subjecting the compound to the action of sulfuric acid, heating the resultant product to a temperature ranging substantially from 300° to 500° C. in the presence of sodium chlorid whereby a sintering of the product is obtained, and recovering the resultant combined titanium from the sintered mass by leaching.

10. As a new and useful article of manufacture, a titanium oxygen compound formed by treating a crude titanium oxygen compound with a decomposing agent, heating the resultant product in the presence of a halogen compound to effect a sintering of the said product, and lixiviating the sintered mass.

11. As a new and useful article of manufacture, a titanium oxygen compound containing water of hydration, formed by treating a crude titanium oxygen compound with a decomposing agent, heating the resultant product in the presence of a halogen compound to effect a sintering of the said product, and lixiviating the sintered mass.

12. As a new and useful article of manufacture, a pigment comprising a titanium oxygen compound containing water of hydration, formed by subjecting a crude titanium compound to the action of sulfuric acid, heating the resultant product to a temperature ranging substantially from 300° to 500° C. in the presence of a chlorid whereby sintering of the product is obtained, and lixiviating the sintered mass.

13. As a new and useful article of manufacture, a pigment comprising a titanium oxygen compound containing water of hydration, formed by subjecting a crude titanium oxygen compound to the action of sulfuric acid, heating the resultant product to a temperature ranging substantially from 300° to 500° C. in the presence of sodium chlorid whereby a sintering of the product is obtained, and lixiviating the sintered mass, substantially as described.

In testimony that I claim the foregoing as my invention, I have signed my name in presence of two subscribing witnesses.

PEDER FARUP.

Witnesses:
 FERNANDA OLSEN,
 BEYEYULF GUNDERSEN.